June 9, 1936.  O. U. ZERK  2,043,875
VEHICLE WHEEL
Filed April 21, 1932   3 Sheets-Sheet 1

INVENTOR:
OSCAR U. ZERK
BY
ATTORNEYS

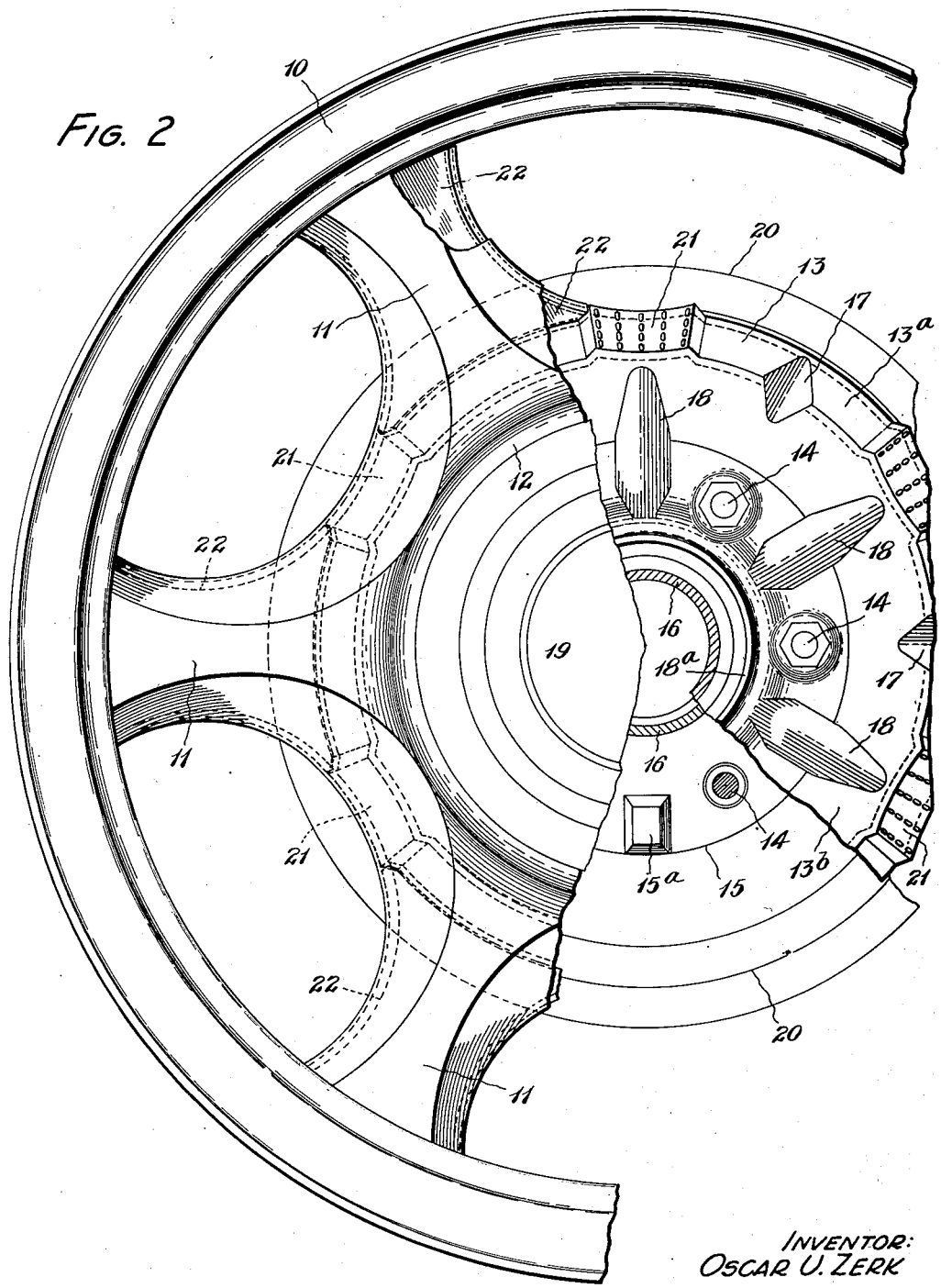

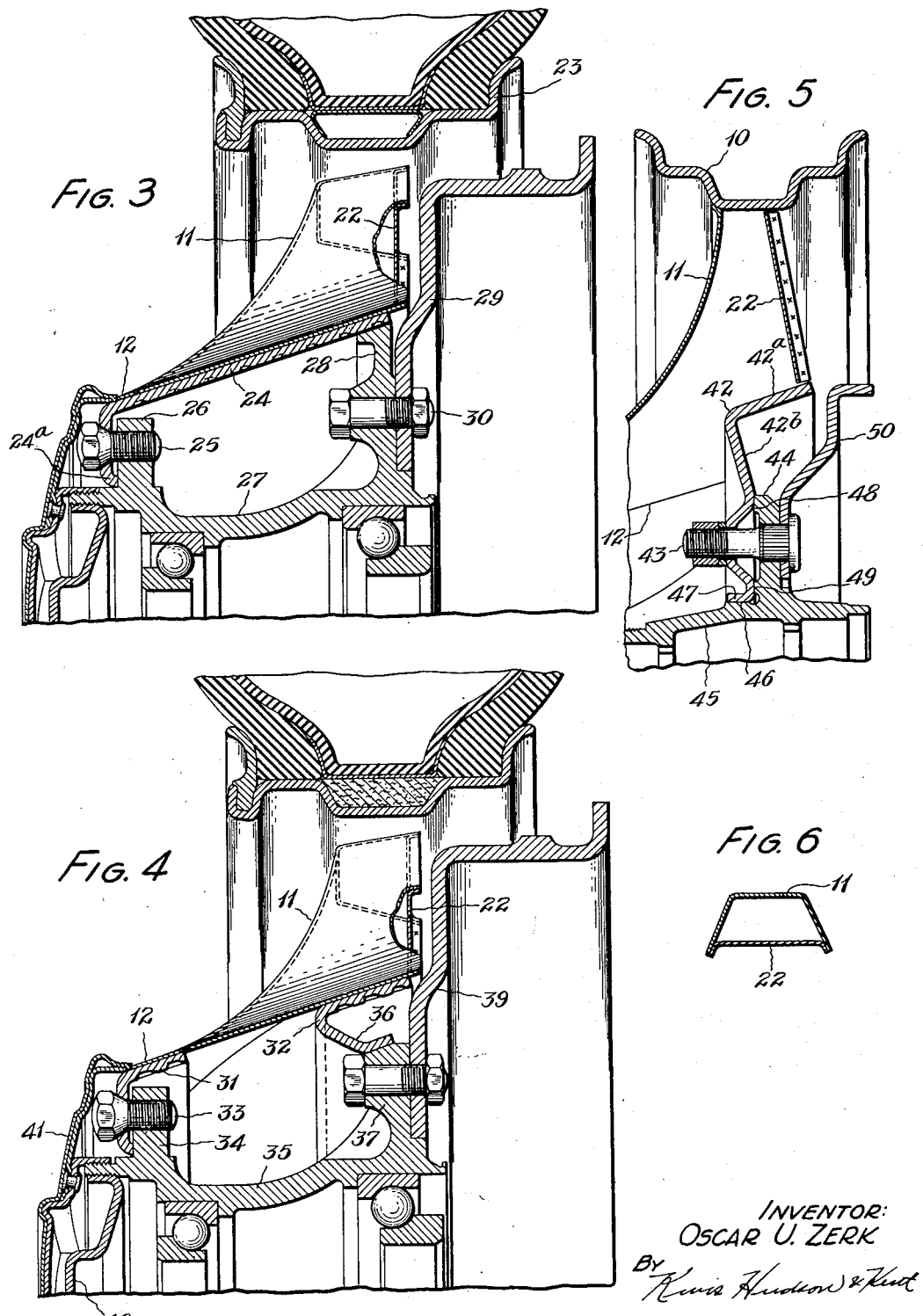

Patented June 9, 1936

2,043,875

UNITED STATES PATENT OFFICE 2,043,875

VEHICLE WHEEL

Oscar U. Zerk, Cleveland, Ohio, assignor to Zerk Corporation, a corporation of Delaware Application April 21, 1932, Serial No. 606,574

5 Claims. (Cl. 301—9)

This invention relates to hub demountable vehicle wheels and particularly to wheels of the general type illustrated in numerous pending applications heretofore filed by me, including applications Serial No. 554,482 filed August 1, 1931, Serial No. 561,541 filed September 8, 1931, and others.

It is characteristic of the wheels of all my applications that they are provided with a very novel but effective and artistic wheel body consisting principally of a sheet metal stamping composed of spokes and an outer hub formed integral therewith, the spokes at their outer ends being secured to any standard form of rim preferably by being welded thereto and at their inner ends merging into the outer hub which at its outer end projects laterally beyond the plane of the rim. The spokes are given a peculiar formation or shape in order that they may have adequate strength and to add to the attractiveness of the wheel.

The spokes are hollow, being substantially U-shaped in cross-section with the closed sides on the outer side of the wheel and the normally open sides on the inner side. The outer sides of the spokes flare from the outer ends of the spokes outwardly to their inner ends where they merge into the outer continuous or annular part of the outer hub. Inwardly of the outer end, the outer hub is composed of concavo-convex portions which lie between the spokes, these being alternated with the spoke openings.

The sides of the spokes are preferably flared laterally from the outer side to the inner side of the wheel, and, additionally, the spokes, when viewed from the front, are flared in two directions from a point intermediate their ends. From this point to their outer ends they flare outwardly, and from the same point to their inner ends where they merge with the outer hub they flare outwardly so that at the point stated the spokes are of smaller cross-section than either above or below it. Preferably also, the outer hub is of generally conical outline so that with this formation, and particularly with a relatively small number of spokes which is preferred, there are left between the spokes substantially oval-shaped openings of rather small depth measured from the rim inwardly, i. e., of greater width than depth. Furthermore, with this construction there is a substantially continuous curvature from the outer end of one spoke to the outer end of the adjoining spoke, this curvature outlining the oval-shaped opening referred to.

As shown in my various applications which I have heretofore filed, including those mentioned above, wheels employing a sheet metal wheel body or including a body stamping such as described above, are susceptible of many modifications, especially in the manner in which the wheel body is demountably attached to the inner hub. For example, the wheel may be attached to a single flange of the inner hub by securing to the outer hub, as by welding, a single wheel attaching member which may be in the form of a stamping with an outer flange which is welded between the spokes to the outer hub and an inner flange which is designed to be bolted in any suitable manner to the flange of the inner hub. This is disclosed in my application Serial No. 554,482.

On the other hand, the wheel body may be supported on two flanges of the inner hub, that is to say, it may be bolted or otherwise detachably secured at its front end to a flange at the front portion of the inner hub and at the same time the rear part of the outer hub may rest upon a flange at the inner portion of the inner hub, this being disclosed in my application Serial No. 561,541, filed September 8, 1931.

When a single wheel attaching member is employed, it will fit into the outer hub and will be welded between the spokes, as stated above, and will thus serve as a strengthening member for the outer hub. Likewise, when the wheel is detachably secured to and supported on two flanges of the inner hub, the outer hub can be very conveniently reinforced as by fitting into and securing to the outer hub between the spokes a sleeve-like member, cup or barrel, the front end of which may be flanged inwardly and bolted to the flange at the front portion of the inner hub and its rear portion may rest upon the flange at the inner end of the inner hub. Or the outer hub may be provided with two drawn or stamped reenforcing members in the form of sleeve or collar-like members, both of which reenforce the outer hub and the forward one may be secured, as above stated, to the flange at the outer end of the inner hub while the other one may be formed so as to engage the flange at the inner end of the inner hub.

Various other changes may be made, but the above brief description will suffice to give an understanding of the main features of the wheel of my prior applications and also the adaptability of this wheel to receive numerous additions or modifications to suit the desires or needs of various manufacturers of automobiles.

In the manufacture of this novel wheel body stamping, there is preferably employed thin sheet steel of about one-sixteenth inch thickness or less which does not readily crystallize, that is, a steel of high fatigue value and high endurance limit, such as chrome nickel steel having a tensile strength of about 140,000 pounds per square inch. The wheel attaching members, which also serve to reenforce the outer hub, as stated above, are preferably made of thicker sheet steel, and in the case of a wheel having a single attaching member to further increase the strength thereof, it may be reenforced by suitably deforming the attaching member in its outer portion or flange between the spokes and in the inwardly extending flange opposite the spokes or between the bolts which attach it to the flange of the inner hub.

I have found that I can very advantageously reenforce the spokes, particularly for heavy duty wheels, so that they may have the requisite strength for sustaining not only heavy loads but severe treatment. The reenforcement of the spokes may be accomplished by suitable closure plates for the normally open inner sides of the spokes, which plates may be welded to the walls of the spokes near the inner side thereof. This I have illustrated in still another copending application filed by me, the same being Serial No. 581,400, filed December 16, 1931. The present application is a continuation in part of the application last mentioned, but in illustrating the feature just mentioned, the same is shown applied to somewhat different types of wheels than those shown in said application Serial No. 581,400, but nevertheless illustrated in my other copending applications previously referred to herein.

In the accompanying sheet of drawings, wherein I have shown the spoke strengthening closure plates applied to several forms of the wheel referred to—

Fig. 2 is a front view of the same with parts broken away;

Figs. 3 and 4 are sectional views showing the spoke strengthening and closure plates applied to wheels as illustrated in my application Serial No. 561,541;

Fig. 5 is a cross-sectional view of the wheel shown in my application Serial No. 581,400; and Fig. 6 is a cross-sectional view of the spoke after the strengthening closure plate has been applied by welding, this view representing in cross-section the spokes of all the different wheel constructions shown herein.

Figure 1:
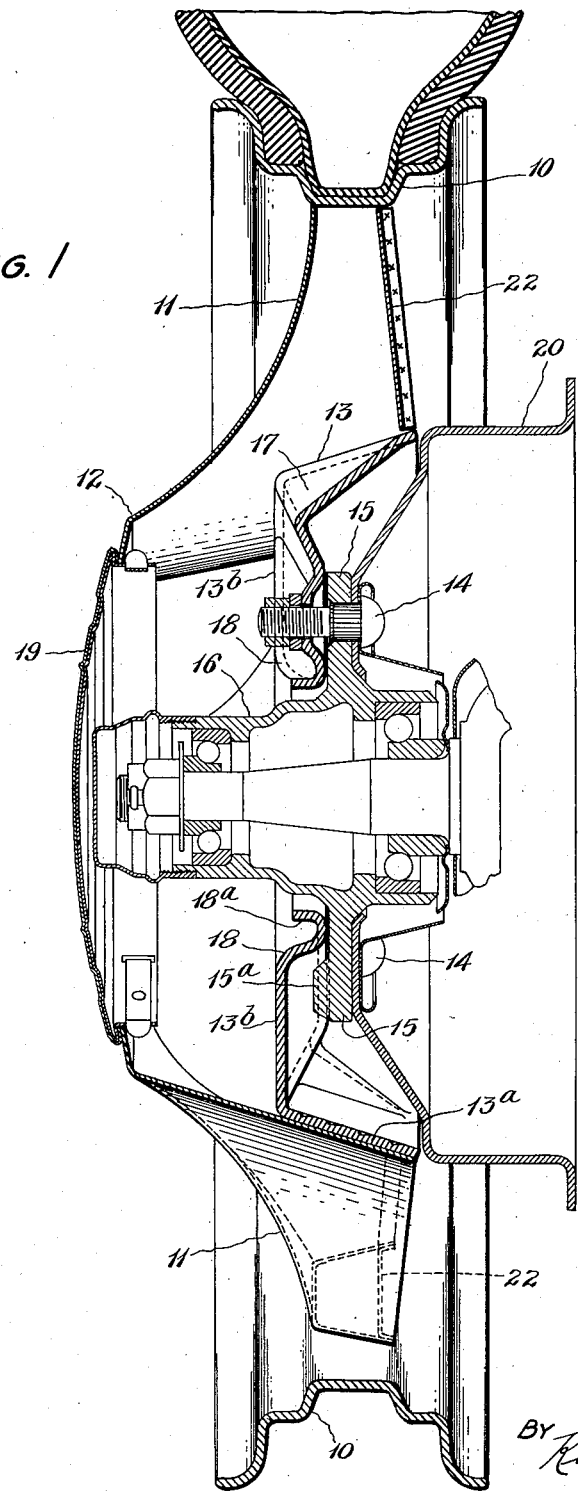
Fig. 1 is a sectional view through a wheel having a single attaching flange, the design of the wheel being quite similar to that shown in my application Serial No. 554,482, in this figure the section through one-half of the wheel being taken through a spoke, and in the other half it being taken between two spokes.

Referring now to the drawings, and first to Figs. 1 and 2, the wheel shown has a rim 10 which may be of any suitable construction and a wheel body composed chiefly of my novel spoke and outer hub stamping formed as heretofore explained and composed of hollow, substantially U-shaped spokes 11 and an outer hub 12 into which the inner ends of the spokes merge, as already pointed out. The outer ends of the spokes will be secured, preferably by welding, to the inner wall of the rim. The outer hub is provided in this instance with a single wheel attaching member 13 which is preferably in the form of a stamping having an outer flange 13a inserted into the outer hub and welded between the spokes to the outer hub and an inner flange 13b which extends inwardly and is secured by any suitable attaching means, in this instance by bolts 14, to the inner hub flange 15 of the inner hub 16. The outer flange 13a of the attaching member 13 is conically formed in accordance with the conical shape of the outer hub 12, and in this instance it is provided in line with the spokes with strengthening deformations 17, while the inwardly extending flange 13b is provided between the spokes with strengthening deformations 18. It will be observed that the outer end of the outer hub 12 is provided with an inturned flange having an opening which is normally closed by an outer hub cap 19 which may be held in place by snap fasteners of the standard type. The outer hub and this hub cap enclose and conceal the wheel attaching means. In this instance, there is secured to the flange 15 of the inner hub by the bolts 14 a brake drum 20.

It will be seen from Figs. 1 and 2 that the spokes have the shape already described. The flare of the outer sides of the spokes from their outer ends to their inner ends is clearly shown in Fig. 1, and from Fig. 2 it will be observed that from a point intermediate their ends, the spokes flare outwardly (laterally) to the rim and from the same point flare outwardly (laterally) to their inner ends, thus giving the necessary strength and artistic lines to the wheel. Likewise, the fact that the side walls are tapered when the spoke is viewed in cross-section is apparent from Figs. 2 and 5. Likewise, it will be seen from Fig. 2 that between the spokes there are oval-shaped or circumferentially elongated spoke openings with the bottom and ends of each opening formed by a sweeping curve extending from the outer end of one spoke to the outer end of the adjoining spoke.

In welding the outer flange 13a of the wheel attaching member to the concavo-convex portions of the outer hub, which portions lie between the spokes, as already explained, either the concavo-convex portions are deformed to conform to the curvature of the flange of the attaching member or the latter is deformed to conform to the concavo-convex portions of the outer hub. The latter is true in this instance, and the deformations of the flange of the attaching member are indicated at 21 in Fig. 2. By deforming the flange of the attaching member rather than the concavo-convex portions, the sweeping curve referred to above is not interrupted and the lines of the wheel are somewhat improved.

With the construction illustrated in Fig. 1, plain bolts and nuts are utilized to secure the inwardly extending flange 18 of the attaching member to the radial flange 15 of the inner hub, but, nevertheless, the flange of the attaching member and the flange of the inner hub may be interlocked so as to relieve the bolts of driving stresses and load stresses. This is accomplished in this instance, as more fully explained in my application Serial No. 554,482, by providing on the flange 15 of the inner hub radially disposed projections 15a having tapered sides, these projections fitting into substantially V-shaped depressions formed by the deformations 18 in the flange 13b of the attaching member. When the wheel is tightened or secured in place by the bolts 14 and the nuts screwed onto the ends thereof, the tapered sides of the projections engage the tapered inner sides of the depressions in the attaching member, and by thus interlocking the engaging parts, the bolts may be relieved entirely or substantially entirely of both driving and load stresses, and the bolts may have a clearance in the bolt holes formed in the attaching member. The central part of the flange 18 of the attaching member has an opening which in this instance is somewhat larger than the body of the hub, and, as shown, at its inner periphery the attaching member is flanged laterally, as at 18a, for strengthening purposes.

It will be observed that the spokes have considerable inherent strength by reason of the shape thereof, notwithstanding the fact that the wheel body stamping is made of rather thin gauge sheet steel. Likewise, it will be seen that the outer hub is strengthened by welding to it the attaching member, the outer hub and the attaching member being secured together substantially inwardly of the rim and therefore in the plane in which the load stresses are principally transmitted. I find that the spokes can be greatly strengthened so as to add to the utility of the wheel by welding to the inner open side walls of the spokes closure and strengthening plates 22, the location of these plates relative to the inner edges of the side walls of the spokes being best illustrated in Fig. 6. These closure plates may be welded to the side walls of the spokes only or their outer ends may be welded to the rim, and, if desired, their inner ends may be welded to the inner portion of the flange 13a of the attaching member. However, I prefer to weld them to the side walls only of the spokes and to leave a slight space between the outer ends of these plates and the rim and a slight space between the inner ends of these plates and the flange 13a of the attaching member so as to permit dirt and the like to be thrown out of the interior of the wheel by centrifugal force and otherwise. The radially inner ends of flanges on the sides of the bracing plates 22 abut the raised shoulder portions 21 in either construction, as shown in Fig. 2.

If it is desired to close the spoke openings so as to conceal the brake drum from view, this can be readily done by a closure plate which I have not indicated in Fig. 1 but which may be readily pressed against the inner side of the wheel and held in place by the brake drum or in any other suitable manner.

In the constructions shown in Figs. 3 and 4, the same kind of spoke and outer hub stamping is employed, except that the outer hub is modified as will be explained below. In the construction illustrated in these figures, the wheel is detachably secured to and supported on two flanges of the inner hub instead of being detachably secured to a single flange of the inner hub, as first described.

In this instance, the rim 23 is of the split ring type, but this type is shown by way of example only. The outer ends of the spokes, which are designated 11 as before, are welded to the inner wall of the rim in the manner previously explained. The outer hub 12 is formed or shaped precisely as explained in connection with Figs. 1 and 2, except that the outer end of the outer hub formed by the spoke and outer hub stamping is not extended inwardly. In Fig. 3 there is fitted into and secured to the hub along the concavo-convex portions between the spokes, a drawn or stamped sleeve or barrel 24 which immensely strengthens the outer hub and constitutes the member which is secured to and engages the two flanges of the inner hub. In this instance, the forward or outer end of the barrel or cup 24 is extended inwardly to form a flange 24a, and this is secured by bolts 25 to the front flange 26 of the inner hub 27. The inner part of the cup or barrel 24 rests upon the flange 28 at the inner part of the inner hub. When the screws are tightened, the inner part of the front flange 24a will bear against the flange 26 of the inner hub and the inner part of the cup or barrel will seat solidly upon the periphery of the inner flange 28 of the inner hub. With the construction illustrated in this figure, the spokes are strengthened as in the construction illustrated in Figs. 1, 2 and 6 by welding closure plates 22 to the inner portions of the side walls of the spokes. Thus both the spokes and the outer hub are reenforced as before. A brake drum, such as illustrated at 29, may be secured to the flange 28 at the inner end of the inner hub by bolts 30 or otherwise, and the spoke openings may be closed as stated in connection with Figs. 1 and 2.

The construction illustrated in Fig. 4 is similar to that shown in Fig. 3 except as to the reenforcement of the outer hub 12. In this instance, the hub is reenforced by two stampings 31 and 32, the former being welded to the front portion of the outer hub inside the latter and having an inturned flange which is secured by bolts 33 to the front flange 34 of the inner hub 35. The other reenforcing stamping 32, which is secured preferably by welding to the concavo-convex portions of the inner portion of the outer hub inside the latter, has an inwardly extending portion 36 which rests upon the inner flange 37 of the inner hub. It will be understood that both these stampings 31 and 32 have outer portions which conform to the taper of the outer hub and will be secured thereto by welding. It will be understood that the stamping 31 is welded to the annular continuous part of the outer hub, whereas the stamping 32 is welded to the concavo-convex portions. Accordingly, as before, either parts of the concavo-convex portions will be deformed to conform to the curvature of the stamping 32 or the latter will be deformed to conform to the curvature of the concavo-convex portions of the outer hub where these two parts are welded together in the manner previously explained.

In this instance, the inner open sides of the spokes are closed and the spokes are strengthened by welding to the side walls closure plates 22 so that the spokes and outer hub will both be reenforced and strengthened so as to avoid unnecessary spring or deformation under heavy loads and shocks.

The wheel shown in Fig. 4 may have a brake drum 39 secured to the inner flange 37 as before, and the inner hub may be closed by an inner hub cap 40 and the opening in the outer hub may be closed by an outer hub cap 41 which may be secured in place in any desired manner, this latter hub cap concealing the attaching bolts 33.

In Fig. 5 I have shown a wheel such as illustrated in my application Serial No. 554,482 in the respect that it is secured to the radial flange of the inner hub by a single wheel attaching member, this construction being illustrated in my application Serial No. 581,400, wherein I have illustrated also closure plates of the type utilized in the constructions illustrated herein. The rim 10 may be of any construction and the spokes 11 and outer hub 12 are formed from a single stamping, as heretofore. The spoke and outer hub stamping is formed in the manner previously explained, and as the spokes and the outer hub have the shape previously described, no further description of these parts is necessary.

In this instance, there is fitted into the outer hub portion of the stamping and welded to the concavo-convex portions thereof between the spokes an attaching member 42 which is preferably in the form of a stamping, as in the instances first described. This attaching member, as before, has a conically shaped outer flange 42a which is welded to the outer hub portion of the stamping, and has an inwardly extending flange 42b which is secured by bolts 43 to the radial flange 44 of the inner hub 45, plain bolts and nuts being used here also. In this instance, the bolts are relieved of load stresses and of the major portion of the driving stresses in a somewhat different manner than before. The body of the inner hub 45 has a machined surface 46 which, in this instance, is cylindrical, but it may be given some other shape, such as conical, if desired. Likewise, the inwardly extending flange 42b of the attaching member 42 has at its inner periphery an outturned flange 47 which is formed so as to fit accurately on the machined surface 46 and thus transmit to the inner hub, independently of the bolts, the load stresses. The radial flange 44 of the inner hub is provided also outwardly of the annular row of bolts with an annular machined surface 48 and inwardly of the row of bolts is provided with a similar machined surface 49, and when the nuts are tightened on the bolts, the annular surfaces of the inwardly extending flange 42b of the attaching member are drawn tightly against these machined surfaces. In this way the bolts are relieved entirely or substantially entirely of the driving stresses, and this result may be enhanced by roughening the surfaces 48 and 49 as by sand-blasting. As shown in Fig. 5, the inwardly extending flange of the attaching member 42 is somewhat dished, and surrounding the holes for the bolts the metal is pressed outwardly in the form of conical projections for strengthening or bracing purposes.

Here again the spokes are strengthened by having their inner normally open sides (the spokes being U-shaped as before) closed by means of closure plates 22 the side edges of which are welded to the side walls of the spokes as before, as best illustrated in Fig. 5. The manner of attaching, the location, and the purpose of the closure plates are the same as described in connection with the preceding figures.

If desired, the attaching bolts 43 may secure in place a brake drum 50. The opening which is formed at the outer end of the outer hub may be closed by a hub cap, as in Fig. 1, it being understood that the outer end of the outer hub 12 may be formed or shaped precisely as in Fig. 1.

While I have shown my invention embodied in different types of wheels, two having means by which the wheel is detachably secured to the inner hub through the medium of bolts and a single attaching member, and two being of the type wherein it is detachably secured to and supported on two flanges of the inner hub, both types of wheels may be modified in many respects. For example, the particular attaching means, i. e., the bolts and nuts, in each type of wheel may be other than herein shown, and, for example, in the types of wheels herein illustrated where the wheel is supported on two flanges of the outer hub, it is not essential to the invention that the outer hub be reenforced and be attached to and rest upon the flanges of the inner hub precisely as herein illustrated.

I therefore aim in my claims to cover all modifications which do not involve a departure from the spirit and scope of my invention.

Having thus described my invention, I claim:

1. In a vehicle wheel, a sheet metal body member having a plurality of spokes and an outer hub integrally formed, the spokes having outer and side walls and open inner sides, the outer wall of each of the spokes flaring axially outwardly from near the outer spoke end to near the outer end of the outer hub, the outer hub comprising a continuous annular portion interconnecting the spoke outer walls, the side and outer walls of the spokes merging with the outer hub, and spoke bracing means positioned adjacent the inner face of the wheel and extending between the side walls of each of the spokes, said spoke bracing means comprising lateral flanges, said flanges welded to the side walls of the spokes and the spoke bracing means forming with said spokes radial load and transverse torque sustaining relatively short stubby box-like structures whose radial extent is substantially less than the outer diameter of the axially outermost circumference of the outer hub and of rapidly increasing cross-sectional area proceeding radially inwardly from a point close to the spoke ends, and a radial bolting-on flange integrally secured to the body member having a generally conical portion provided with a plurality of raised shoulder portions, the radially inner ends of the bracing means flanges abutting adjacent shoulder portions.

2. In a vehicle wheel, a sheet metal body member having a plurality of spokes and an outer hub integrally formed, the spokes being substantially U-shaped, the side walls of the spokes and the portions of the outer hub between the spokes forming sweeping curves extending from substantially the outer end of one spoke to substantially the outer end of the adjoining spoke, the axially outer spoke walls flaring axially outwardly from near the spoke outer ends and being interconnected by an annular axially outer portion of the outer hub and bracing means positioned adjacent the inner face of the wheel and joining the side walls of each of the spokes, said bracing means comprising lateral flanges, said flanges welded to the side walls of the spokes and the spoke bracing means forming with said spokes radial load and transverse torque sustaining relatively short stubby box-like structures whose radial extent is substantially less than the outer diameter of the axially outermost circumference of the outer hub and of rapidly increasing cross-sectional area proceeding radially inwardly from a point close to the spoke ends, and a radial bolting-on flange integrally secured to the body member including a generally conical portion provided with a plurality of raised shoulder portions, the radially inner ends of the bracing means flanges abutting adjacent shoulder portions.

3. In a vehicle wheel, a sheet metal body member having a plurality of substantially U-shaped spokes and an outer hub integrally formed, the outer wall of each of the spokes flaring axially outwardly from adjacent the spoke outer ends and to substantially the axially outer end of the outer hub, the side walls of the spokes forming sweeping curves extending from substantially the outer end of one spoke to substantially the outer end of the adjoining spoke, and bracing means for said spokes, said means being positioned adjacent the inner face of the wheel and joining the side walls of each of the spokes, said bracing means comprising lateral flanges, said flanges welded to the side walls of the spokes and the spoke bracing means forming with said spokes radial load and transverse torque sustaining relatively short stubby box-like structures whose radial extent is substantially less than the outer diameter of the axially outermost circumference of the outer hub, and a radial bolting-on flange integrally secured to the body member having a generally conical portion provided with a plurality of raised shoulder portions, the radially inner ends of the bracing means flanges abutting adjacent shoulder portions.

4. In a vehicle wheel, in combination, a sheet metal body member having a plurality of spokes and an outer hub integrally formed, the side walls of the spokes curving outwardly toward the inner and outer ends thereof, the side walls of the spokes and the portions of the outer hub between the spokes forming continuous curves extending from substantially the outer end of one spoke to substantially the outer end of the adjoining spoke, and means positioned adjacent the inner face of the wheel and joining the side walls of each of the spokes, said means comprising lateral flanges, said flanges welded to the side walls of the spokes and the spoke bracing means forming with said spokes radial load and transverse torque sustaining relatively short stubby box-like structures whose radial extent is substantially less than the outer diameter of the axially outermost circumference of the outer hub and of rapidly increasing cross-sectional area proceeding radially from a point close to the spoke ends, and a radial bolting-on flange integrally secured to the body member having a generally conical portion provided with a plurality of raised shoulder portions, the radially inner ends of the bracing means flanges abutting adjacent shoulder portions.

5. In a vehicle wheel, a sheet metal body member having a plurality of spokes and an outer hub integrally formed, the spokes having outer and side walls and open inner sides, the outer wall of each of the spokes flaring axially outwardly from near the outer spoke end to near the outer end of the outer hub, the side and outer walls of the spokes merging with the outer hub, and spoke bracing means positioned adjacent the inner face of the wheel and extending between the side walls of each of the spokes, said spoke bracing means channel shaped in cross section throughout their length and comprising lateral flanges, said flanges welded to the side walls of the spokes and the spoke bracing means forming with said spokes radial load and transverse torque sustaining relatively short stubby box-like structures whose radial extent is substantially less than the outer diameter of the axially outermost circumference of the outer hub and of rapidly increasing cross-sectional area proceeding radially inwardly from a point close to the spoke ends, whereby the included area at the radial inner end of the spokes is substantially twice that at the spoke outer ends, and a radial bolting-on flange integrally secured to the body member having a generally conical portion provided with a plurality of raised shoulder portions weldingly secured to the outer hub, the radially inner ends of the bracing means flanges abutting adjacent shoulder portions.

OSCAR U. ZERK.